(12) United States Patent
Alfaro

(10) Patent No.: US 11,766,035 B2
(45) Date of Patent: Sep. 26, 2023

(54) FISHING ROD HANDLING DEVICE

(71) Applicant: Joseph Alfaro, Simi Valley, CA (US)

(72) Inventor: Joseph Alfaro, Simi Valley, CA (US)

(*) Notice: Subject to any disclaimer, the term of this patent is extended or adjusted under 35 U.S.C. 154(b) by 241 days.

(21) Appl. No.: 17/207,349

(22) Filed: Mar. 19, 2021

(65) Prior Publication Data
US 2021/0289763 A1 Sep. 23, 2021

Related U.S. Application Data

(60) Provisional application No. 62/992,056, filed on Mar. 19, 2020.

(51) Int. Cl.
A01K 97/10 (2006.01)
A01K 87/08 (2006.01)

(52) U.S. Cl.
CPC .............. A01K 97/10 (2013.01); A01K 87/08 (2013.01)

(58) Field of Classification Search
CPC ........ A01K 97/10; A01K 87/08; A01K 87/00; A01K 87/008; A01K 97/00; A45B 9/02; A01B 1/026
USPC ........ 43/25, 18.1 R, 21.2, 23; 16/110.1, 421, 16/422, 429, 430
See application file for complete search history.

(56) References Cited

U.S. PATENT DOCUMENTS

| | | | | |
|---|---|---|---|---|
| 584,133 A * | 6/1897 | McIntire | .................. | B60N 3/02 105/354 |
| 652,096 A * | 6/1900 | Dunn | ...................... | F41A 29/02 15/104.165 |
| 673,772 A * | 5/1901 | Hall | .......................... | B25D 1/02 403/334 |
| 955,366 A * | 4/1910 | Simons | ................ | A01K 89/015 242/224 |
| 980,942 A * | 1/1911 | Hanson | .................. | A01K 87/08 43/21.2 |
| 1,692,490 A * | 11/1928 | Dragon | ..................... | B25G 3/32 16/422 |
| 1,858,380 A * | 5/1932 | Stoddard | ................ | B23D 71/00 407/29.15 |
| 1,889,400 A * | 11/1932 | Dorfman | .................. | B25G 3/32 16/422 |
| 1,898,323 A * | 2/1933 | Teetor | .................... | A01K 87/08 43/18.1 R |
| 2,084,931 A * | 6/1937 | Williams | ............... | A01K 87/08 43/23 |
| 2,244,408 A * | 6/1941 | Thompson | ............. | A01K 87/08 43/25 |

(Continued)

Primary Examiner — Darren W Ark
Assistant Examiner — Katelyn T Truong

(57) ABSTRACT

The fishing rod handling device is an apparatus that can reduce the amount of stress received by wrists of users when reeling in game fish. To accomplish this, the device includes a handle attachment and a forearm grip attachment that may be detachably mounted onto a fishing rod. The handle attachment allows a user to hold the fishing rod in a comfortable position, since the handle attachment is oriented in a direction perpendicular to a longitudinal axis of the fishing rod. Further, the forearm grip attachment allows users to rest their forearms in a stable position, such that users may hold the handle attachment with their wrists and forearms in alignment. Additionally, a shoulder strap may be attached to the handle attachment, to provide additional support. Thus, the device allows for a strong and stable grip without causing any wrist injuries when reeling in game fish.

15 Claims, 12 Drawing Sheets

(56) References Cited

U.S. PATENT DOCUMENTS

| | | | | | |
|---|---|---|---|---|---|
| 2,761,236 | A * | 9/1956 | Gaston | A01K 87/08 43/25 |
| 3,269,399 | A * | 8/1966 | Smith | A61H 3/02 401/6 |
| 3,367,056 | A * | 2/1968 | Johnson | A01K 87/08 D8/394 |
| 3,372,509 | A * | 3/1968 | Arsenault | A01K 87/08 43/25 |
| 5,012,607 | A * | 5/1991 | Meschkat | A01K 87/08 43/25 |
| 5,451,085 | A * | 9/1995 | Wagner | B25G 3/20 294/58 |
| 5,910,004 | A * | 6/1999 | Antosh | A01K 87/08 224/267 |
| 6,295,755 | B1 * | 10/2001 | Macaluso | A01K 87/08 43/25 |
| 6,314,617 | B1 * | 11/2001 | Hastings | A63B 60/08 16/431 |
| 6,464,272 | B1 * | 10/2002 | Michaud | B25G 1/00 294/58 |
| D466,395 | S * | 12/2002 | Van Houten, II | D8/354 |
| 6,601,814 | B2 * | 8/2003 | Kovacik | F16M 11/08 362/396 |
| 7,160,232 | B2 * | 1/2007 | Barnard | F16F 1/12 482/121 |
| D584,792 | S * | 1/2009 | Childers | D22/147 |
| 7,540,831 | B2 * | 6/2009 | Hauser | A63B 1/00 482/40 |
| 7,566,292 | B1 * | 7/2009 | Hauser | A63B 23/12 482/40 |
| 7,780,648 | B2 * | 8/2010 | McIntyre | A61M 25/0136 604/95.04 |
| 8,602,950 | B2 * | 12/2013 | Savarino | B25G 1/10 267/74 |
| 9,507,371 | B1 * | 11/2016 | Day | G05G 1/54 |
| 10,179,401 | B2 * | 1/2019 | Nyland | B25G 1/06 |
| 2011/0005790 | A1 * | 1/2011 | Frank | B25F 5/026 16/421 |
| 2014/0059807 | A1 * | 3/2014 | Savarino | B25G 1/10 16/422 |
| 2014/0165336 | A1 * | 6/2014 | Guyoton | A63C 11/2224 16/430 |

* cited by examiner

FISHING ROD HANDLING DEVICE

The current application claims a priority to the U.S. Provisional Patent application Ser. No. 62/992,056 filed on Mar. 19, 2020.

FIELD OF THE INVENTION

The present invention relates generally to a handling apparatus for fishing rods. More specifically, the present invention relates to a handle attachment and a forearm attachment that allow a user to hold the fishing rod with their wrist and forearms in alignment.

BACKGROUND OF THE INVENTION

Anglers have always loved the fight that comes with reeling in game fish while standing up. However, when it comes to big-game fishing, a standalone fishing rod is does not provide enough support for anglers to reel in powerful game fish. As a result, anglers need to attach accessories and mounts to the fishing rod to reel in powerful game fish. A common accessory used for anglers that fish while standing up is a fighting belt. The fighting belt is worn by a user and attaches to the rear end of a fishing rod device. The fighting belt can be used as a fulcrum for a fishing rod device, making it easier for a user to pull in game fish that are trying to swim away from the boat. One flaw with fighting belts is that they do not provide significant support for reeling in game fish that swim erratically. Anglers, even while wearing a fighting belt, hold a fishing rod with their wrists not lined up with their forearms. This type of grip makes it difficult for the user's wrist to resist the side-to-side motion of a fish swimming erratically. In addition, since the user's wrist are not lined up with their forearms, the user's wrist will receive a lot of stress while reeling in the fish, leading to possible wrist injuries. The best type of grip to handle sudden side to side motions requires the user's wrist to be lined up with their forearms. With the user's wrists and forearms lined up, the user can reduce the amount of stress received by their wrists when reeling in game fish. Though there are fishing accessories that support the forearm of a user, none of them make it easier on the user's wrist by changing the type of grip. Therefore, there is a need for a device that allows a user to hold a fishing rod with their wrist and forearms in alignment.

It is an objective of the present invention to provide users with an apparatus that can reduce the amount of stress received by wrists of users when reeling in game fish. In order to accomplish this, the present invention comprises a handle attachment and a forearm grip attachment that may be detachably mounted onto a fishing rod. The handle attachment allows a user to hold the fishing rod in a comfortable position, since the handle attachment is oriented to be perpendicular to a longitudinal axis of the fishing rod. Further, the forearm grip attachment allows users to rest their forearms in a stable position while holding onto the handle attachment, such that the orientation of the present invention allows a user to hold the fishing rod with their wrists and forearms in alignment. Additionally, the handle may further be attached to a shoulder strap to provide additional support for the user while using the fishing rod. Thus, the present invention allows users to have a strong and stable grip while reeling in game fishes, without causing any wrist injuries.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 12, the present invention is a fishing rod handling device. It is an objective of the present invention to provide users with an apparatus that can reduce the amount of stress received by wrists of users when reeling in game fish. In order to accomplish this, the present invention comprises a handle attachment and a forearm grip attachment that may be detachably mounted onto a fishing rod. The handle attachment allows a user to hold the fishing rod in a comfortable position, since the handle attachment is oriented to be perpendicular to a longitudinal axis of the fishing rod. Further, the forearm grip attachment allows users to rest their forearms in a stable position while holding onto the handle attachment, such that the orientation of the present invention allows a user to hold the fishing rod with their wrists and forearms in alignment. Additionally, the handle may further be attached to a shoulder strap to provide additional support for the fishing rod. Thus, the present invention allows users to have a strong and stable grip while reeling in game fishes, without causing any wrist injuries.

Figure 1:
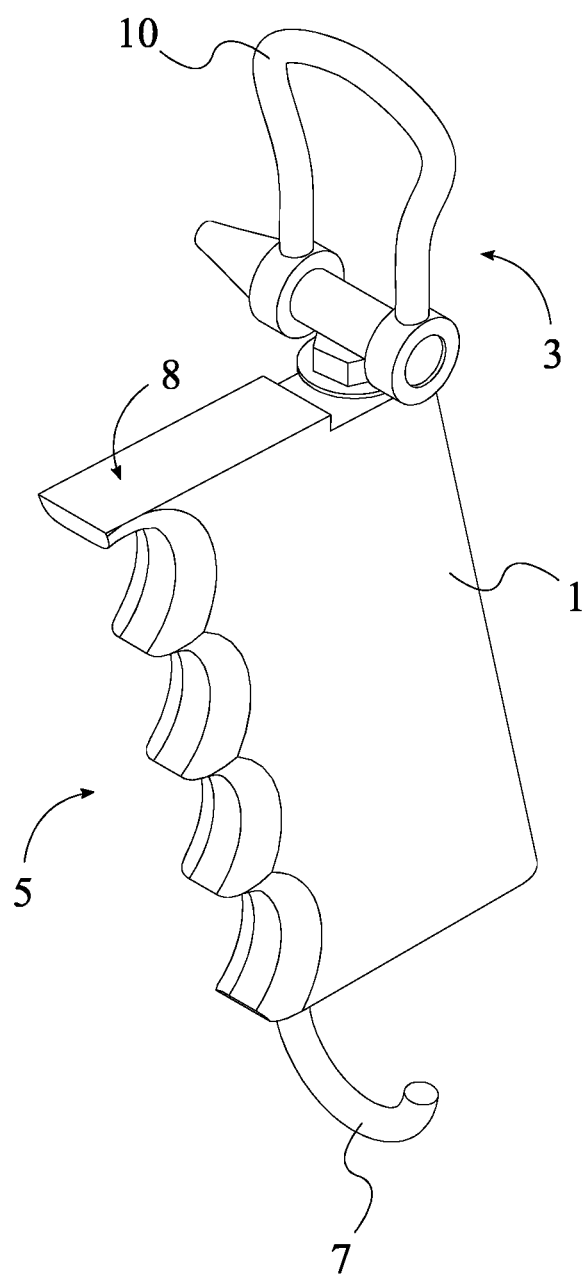
FIG. 1 is a top-front-left perspective view of a handle attachment of the present invention.
Figure 2:
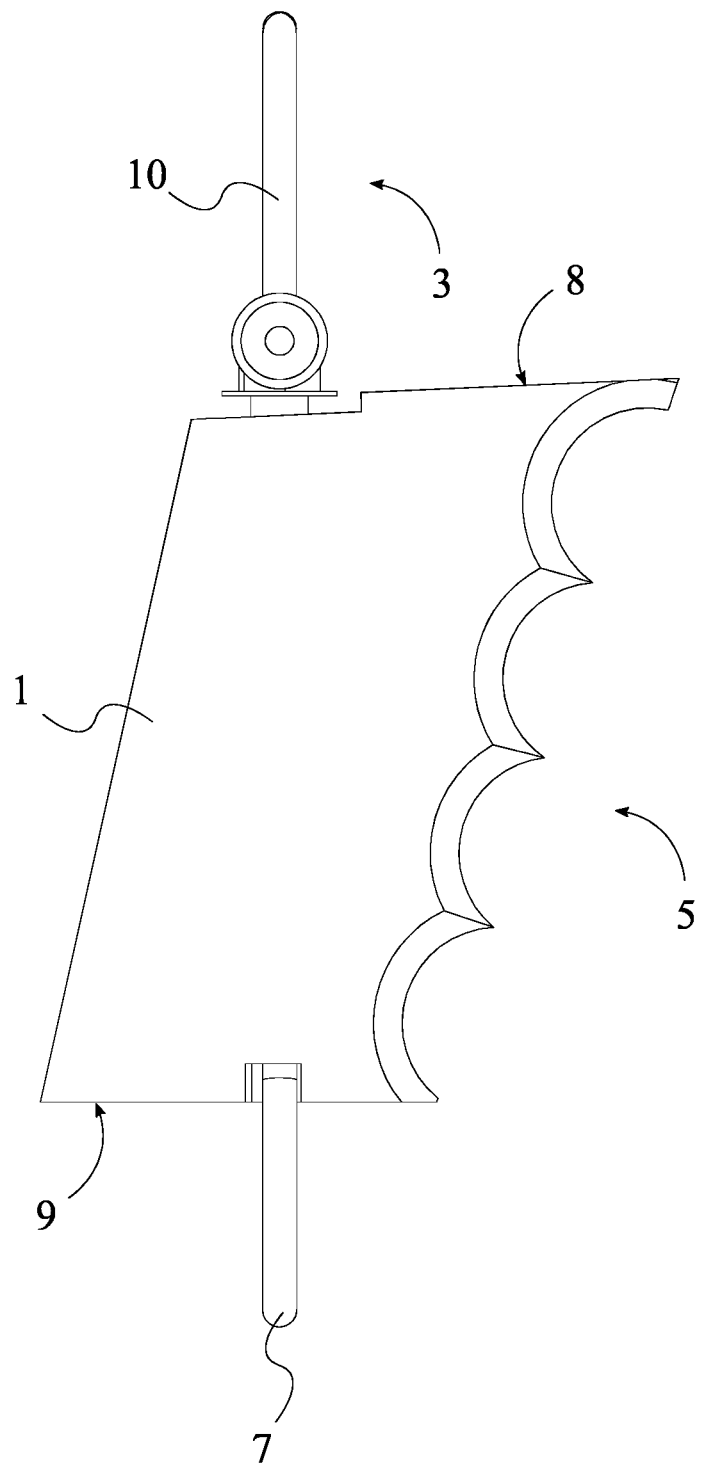
FIG. 2 is a right-side elevational view of the handle attachment.
Figure 3:
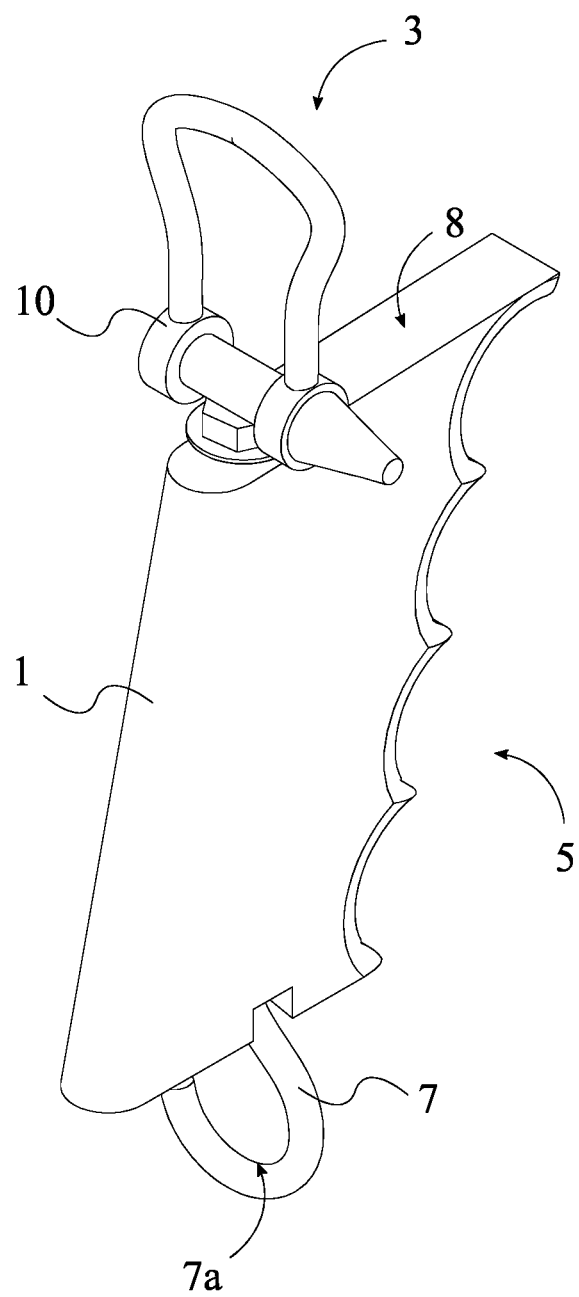
FIG. 3 is a top-rear-right perspective view of the handle attachment.

The following description is in reference to FIG. 1 through FIG. 12. According to a preferred embodiment, a handle attachment 1a of the present invention comprises a handle body 1, a clasp member 2, a latch member 3, and a channel 4. Preferably, the handle body 1 comprises a grip portion 5, and the grip portion 5 is laterally mounted onto the handle body 1. Additionally, as seen in FIG. 2, the grip portion 5 is angularly offset from the channel 5, to enable a stronger grip. The grip portion 5 has multiple ridges so as to provide an ergonomic grip for the user. It is preferred that the handle body 1 is made of wood or any other suitable material, and the handle body 1 has the shape of a parallelogram. However, the handle body 1 may comprise any other shape, size, material, components and arrangement of components that are known to one of ordinary skill in the art, as long as the intents of the present invention are fulfilled. Further, the channel 4 normally traverses into the handle body 1, such that the channel 4 may be a pathway for the clasp member 2.

Figure 4:
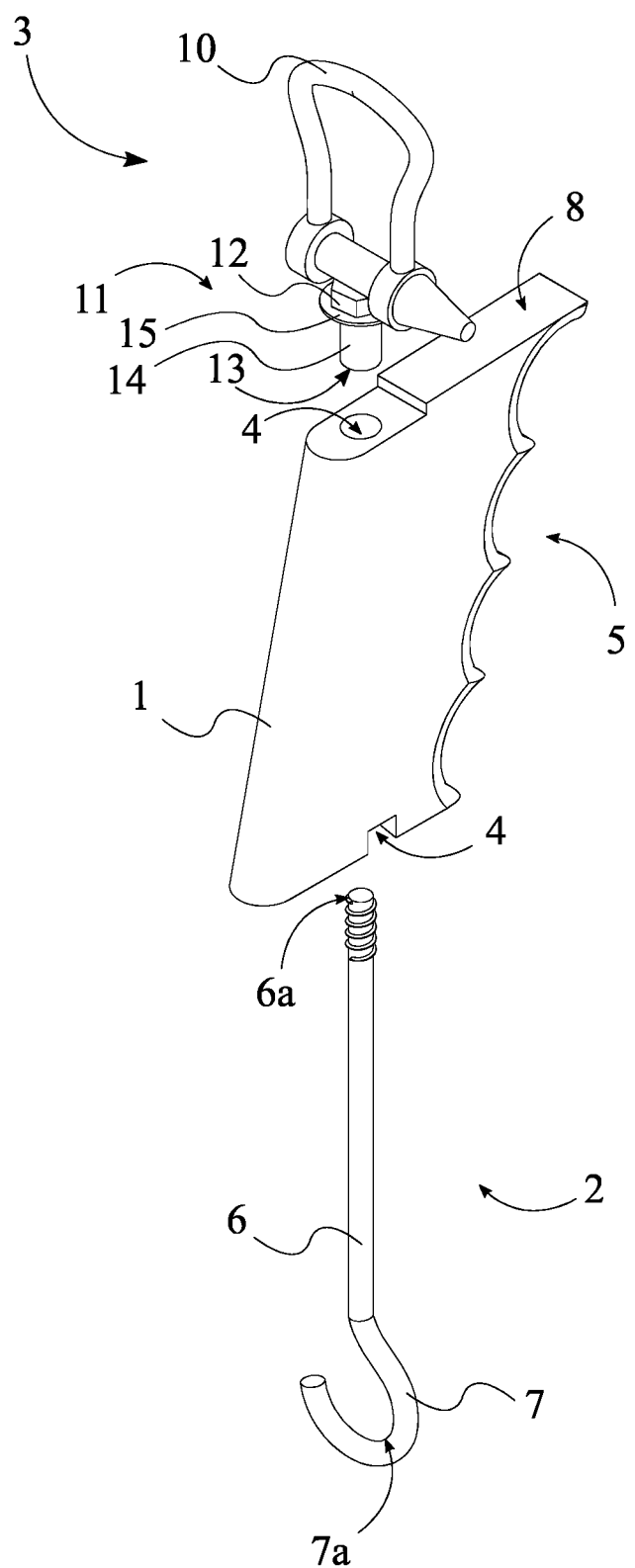
FIG. 4 is an exploded view of FIG. 3.
Figure 5:
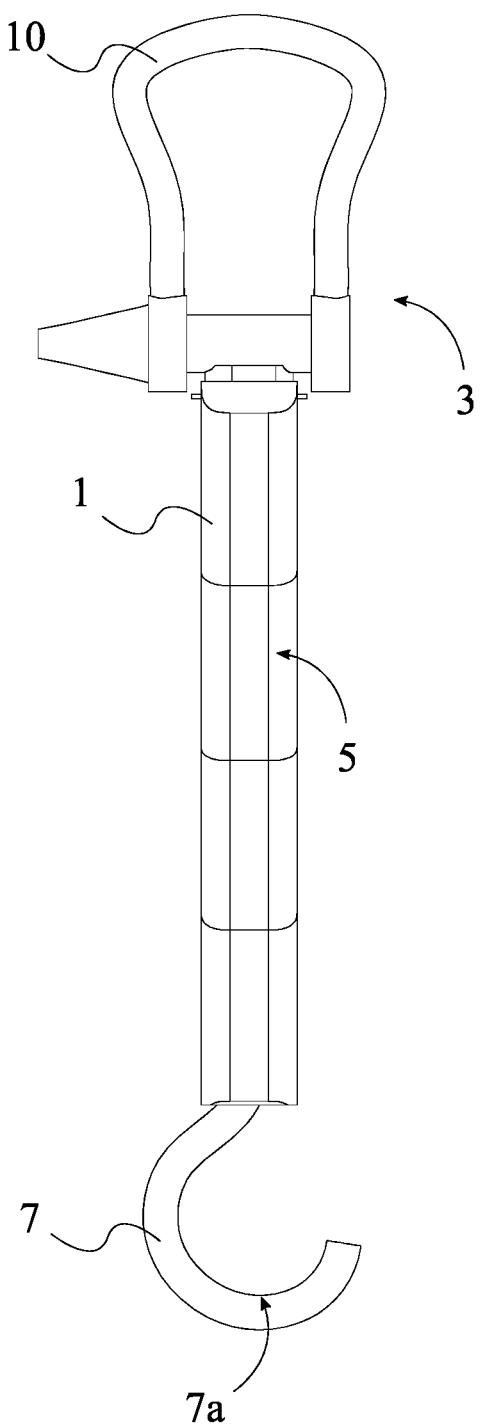
FIG. 5 is a front side elevational view of the handle attachment.

In the preferred embodiment, the clasp member 2 and the latch member 3 are both inserted into the handle body 1, such that the clasp member 2 can engage the latch member 3 to secure the handle body 1 to any fishing rod. To accomplish this, the clasp member 2 comprises a control linkage 6 and a hook 7, wherein the hook 7 is terminally mounted onto the control linkage 6. As seen in FIG. 4, the control linkage 6 is a partially threaded shaft, and the hook 7 is a C-shaped clasp. However, the clasp member 2 may comprise any other linking mechanism that is known to one of ordinary skill in the art, as long as the objectives of the present invention are not altered. Further, the control linkage 6 is engaged within the channel 4 and a terminal end 6a of the control linkage 6 protrudes out of the channel 4 adjacent a first surface 8 of the handle body 1, such that the latch member 3 can receive the clasp member 2 and secure the clasp member 2 within the channel 4 of the handle body 1. Subsequently, the hook 7 protrudes out of the channel 4 adjacent a second surface 9 of the handle body 1 opposite to the first surface 8, such that the hook can engage with the handle of a fishing rod device. Furthermore, the latch member 3 is operably connected to the clasp member 2, such that rotary motion of the latch member 3 governs the distance between a bottom edge 7a of the hook 7 and the second surface 9 of the handle body 1. In other words, rotary motion of the latch member 3 governs the tightening and loosening of the clasp member's 2 clasp around a fishing rod device. However, it should be noted that the latch member 3 may be engaged to the clasp member 2 through any other fastening mechanism that is known to one of ordinary skill in the art, as long as the intents of the present invention are not altered.

According to the preferred embodiment of the present invention, and wherein the control linkage 6 is a threaded shaft, the latch member 3 is engaged to the terminal end 6a of the control linkage 6 or the threaded region of the shaft. To accomplish this, the latch member 3 comprises a latch 10, a screw socket 11, and a nut 12. As seen in FIG. 4, the latch 10 is mounted opposite to the screw socket 11 across the nut 12. The nut 12 is connected to the screw socket 11 and may be rotated to help secure the clasp member 2 to the screw socket 11. This is so that, as the clasp member 2 is being secured to the screw socket 11, the hook 7 and the second surface 9 of the handle body 1 are forced to clamp onto the fishing rod device, securing the handle attachment 1a to the fishing rod device. To that end, a first terminal end 13 of the screw socket 11 is positioned within the channel 4 adjacent the first surface 8, so that the screw socket 11 may be engaged to the terminal end 6a of the control linkage 6. In other words, the screw socket 11 is inserted into the channel 4, so that the screw socket 11 may receive the control linkage 6 (threaded shaft) of the clasp member 2. Further, the screw socket 11 comprises a socket body 14 and a flange 15. The flange 15 is intended to prevent the screw socket 11 from being completely inserted into the channel 4 of the handle body 1. To accomplish this, the flange 15 is terminally mounted onto the socket body 14 opposite to the first terminal end 13 of the screw socket 11, and a transverse cross section of the flange 15 is made greater than a transverse cross section of the channel 4.

In reference to FIG. 6 through FIG. 12, the present invention comprises a cradle attachment 16 for providing additional support for the forearm. The cradle attachment 16 comprises an armrest 17, a connecting base 18, and a fastener 19. Preferably, the armrest 17 is mounted onto a planar surface 20 of the connecting base 18, and the fastener 19 is detachably mounted onto a curved surface 21 of the connecting base 18, opposite to the planar surface 20 of the connecting base 18. Thus, the connecting base 18 acts as the interconnecting component between the armrest 17 and the fastener 19, such that the fastener 19 is mounted below the connecting base 18 for fastening the cradle attachment 16 onto a fishing rod device and the armrest 17 is mounted on top of the connecting base 18, facing the user.

Figure 6:
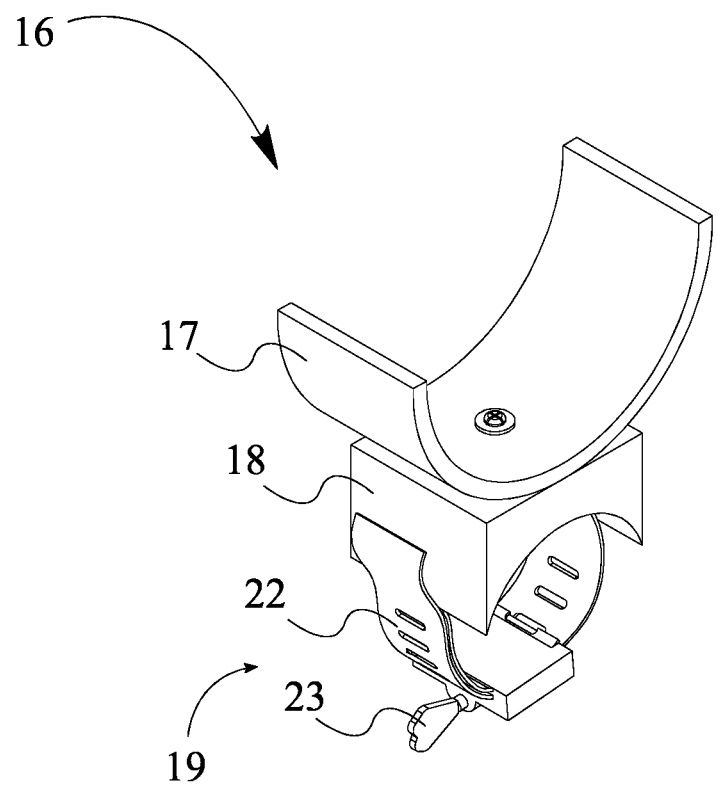
FIG. 6 is a top-front-right perspective view of a forearm attachment of the present invention.
Figure 7:
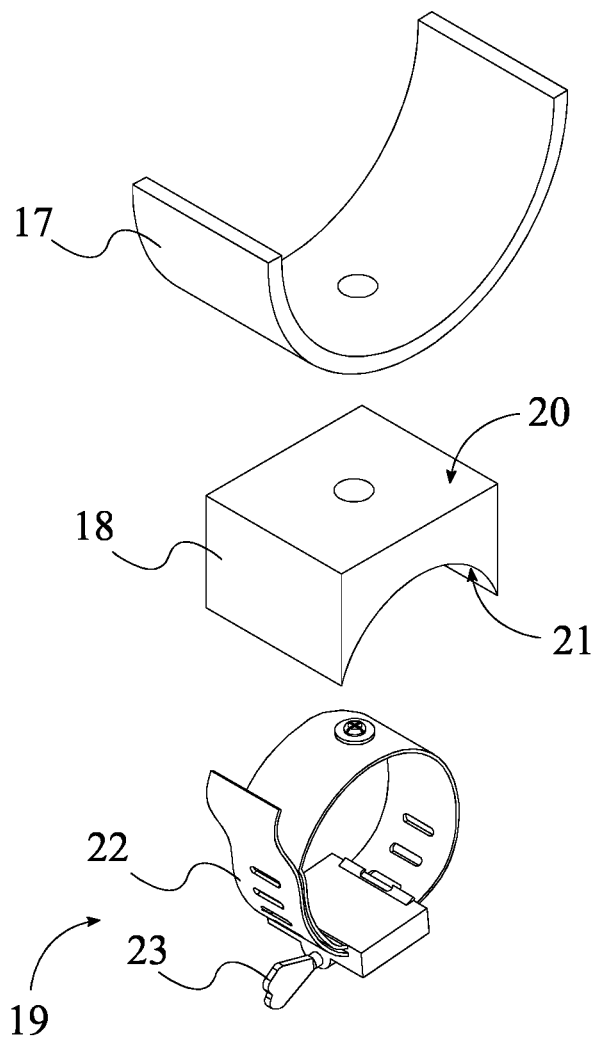
FIG. 7 is an exploded view of FIG. 6.
Figure 8:
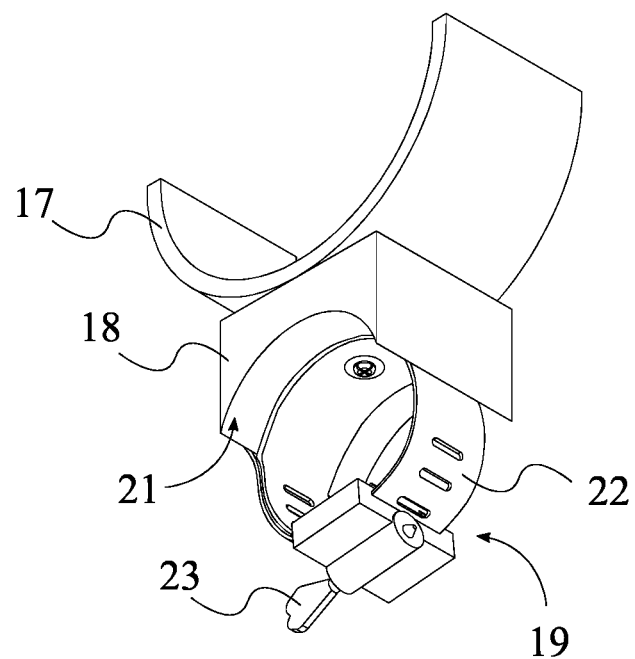
FIG. 8 is a bottom-front-left perspective view of the forearm attachment.
Figure 9:
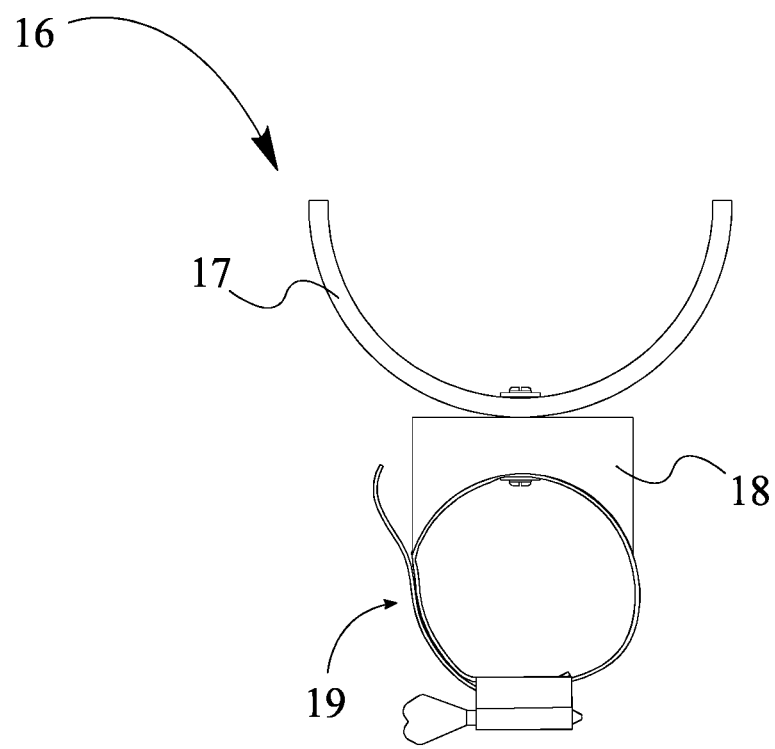
FIG. 9 is front elevational view of the forearm attachment.
Figure 10:
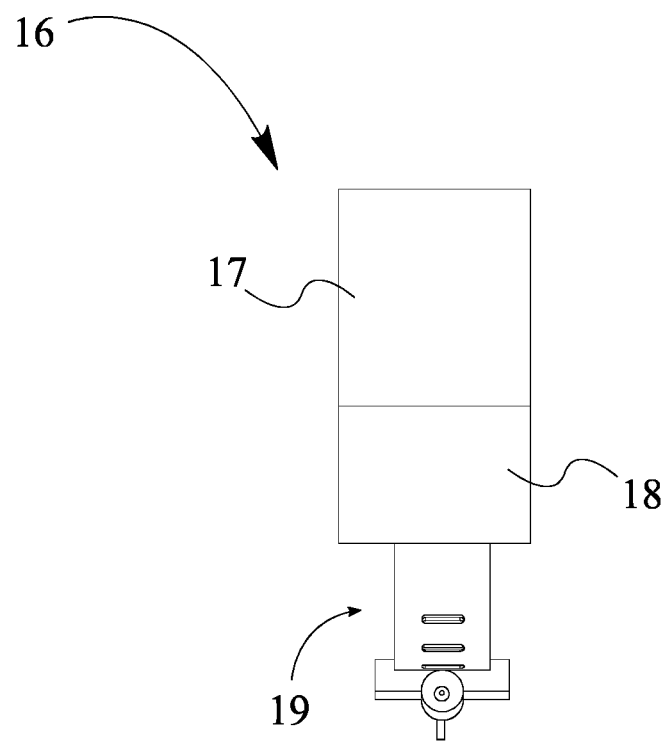
FIG. 10 is a left side elevational view of the forearm attachment.
Figure 11:
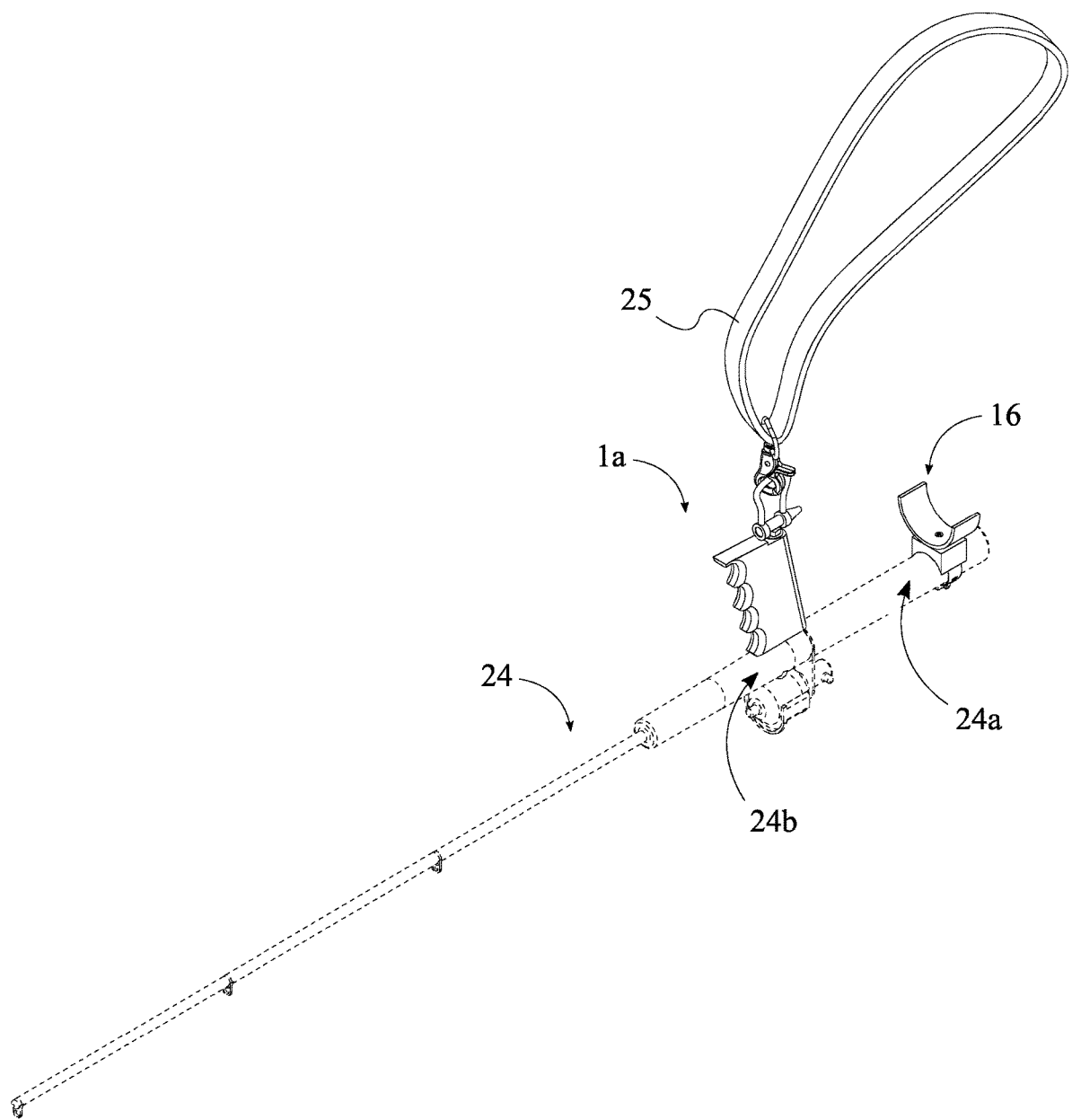
FIG. 11 is a top-front-left perspective view of the present invention on a fishing rod.
Figure 12:
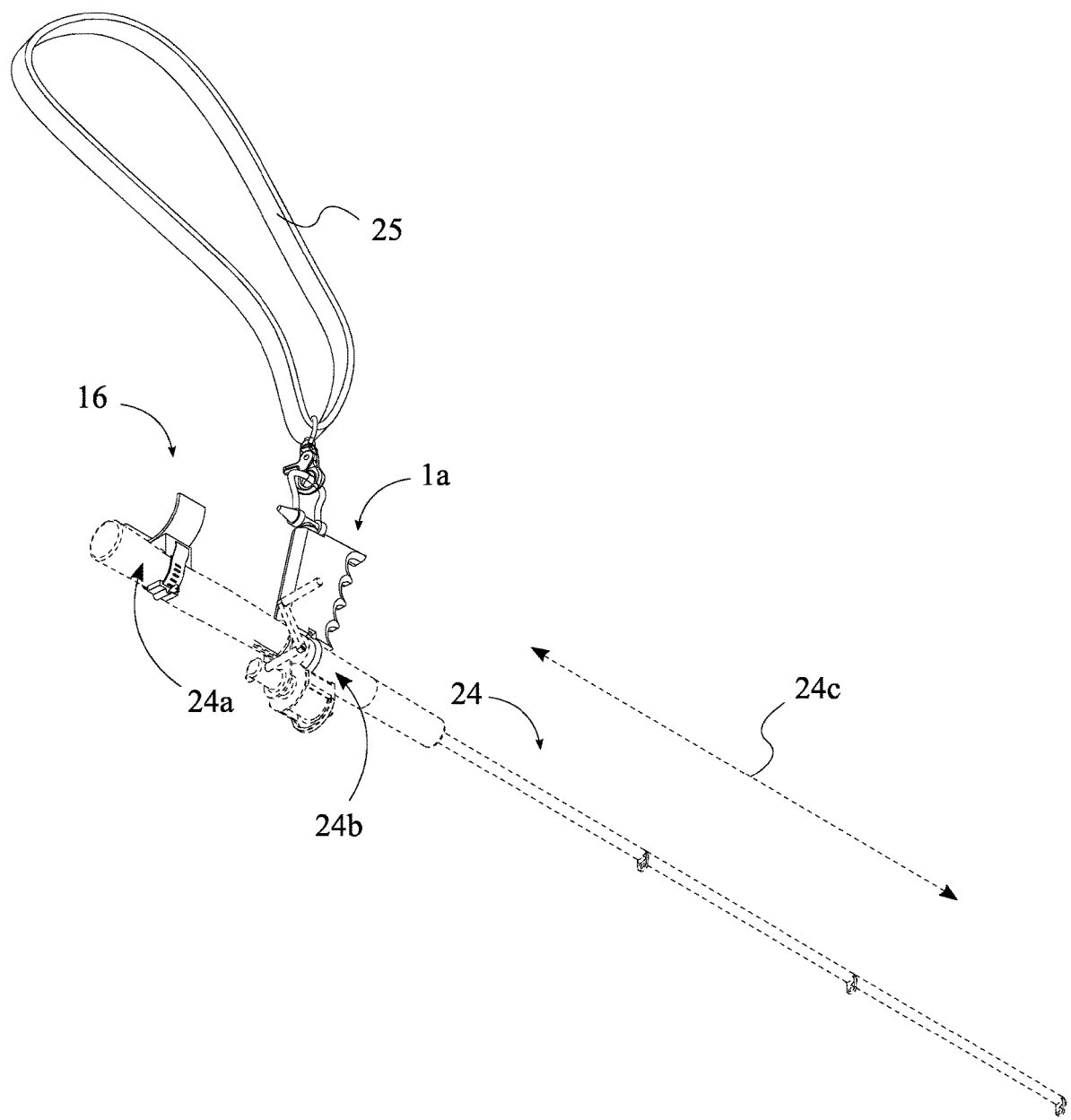
FIG. 12 is a bottom-rear right perspective view of the present invention on the fishing rod.

According to the preferred embodiment, the fastener 19 comprises a fastening belt 22 and a fastening key 23. As seen in FIG. 6 through FIG. 8, the fastening belt 22 is mounted onto the curved surface 21 of the connecting base 18 creating a loop. This is so that the fastening belt 22 may be placed around the cylindrical handle of a fishing rod device. Further, the fastening key 23 is operably coupled to the fastening belt 22, such that manipulating the fastening key 23 governs the diameter of the loop. However, the fastener 19 may comprise any other size, shape, components and arrangement of components that are known to one of ordinary skill in the art, as long as the intents of the present invention are not altered. Furthermore, as seen in FIG. 7, the armrest 17 is semi-circular in shape. However, the armrest 17 and the connecting base 18 may comprise any other size, shape etc. that are known to one of ordinary skill in the art, as long as the objectives of the present invention are fulfilled. In order to align the wrist and forearm of the user, the cradle attachment 16 is detachably mounted onto a fishing rod 24, and the fastener 19 is removably engaged with a handle portion 24a of the fishing rod 24. As seen in FIG. 11 and FIG. 12, the handle attachment 1a is detachably mounted onto the fishing rod 24, and the clasp member 2 is engaged adjacent a reel seat section 24b of the fishing rod 24. More specifically, the fishing rod 24 is positioned between the hook 7 of the clasp member 2 and the second surface 9 of the handle body 1. Further, the alignment of the handle attachment 1a allows the user to hold the fishing rod 24 in a comfortable position, since the handle attachment 1a is oriented normally to a longitudinal axis 25c of the fishing rod 24.

According to the preferred embodiment, the present invention further comprises a shoulder strap 25 for providing additional support and leverage to the user reeling in any game fish. As seen in FIG. 11 and FIG. 12, the shoulder strap 25 is detachably connected to the latch 10 of the latch member 3. Preferably, the shoulder strap 25 is connected with the help of a snap clip. However, the shoulder strap 25 may comprise any size, shape, components, arrangement of components etc. that is known to one of ordinary skill in the art, as well as may comprise any other fastening means to connect to the latch member, as long as the intents of the present invention are not altered.

Although the invention has been explained in relation to its preferred embodiment, it is to be understood that many other possible modifications and variations can be made without departing from the spirit and scope of the invention as hereinafter claimed.

What is claimed is:

1. A fishing rod handle device, comprising:
a handle body;
a clasp member;
a latch member;
a channel;
the handle body comprising a grip portion;
the clasp member comprising a control linkage and a hook;
the channel normally traversing into the handle body;
the grip portion being laterally mounted onto the handle body;
the hook being terminally mounted onto the control linkage;
the control linkage being engaged within the channel;

a terminal end of the control linkage protruding out of the channel adjacent a first surface of the handle body;

the hook protruding out of the channel adjacent a second surface of the handle body opposite to the first surface;

the latch member being operably connected to the clasp member, such that rotary motion of the latch member governs the distance between a bottom edge of the hook and the second surface of the handle body;

the handle body being detachably mounted onto a fishing rod;

the clasp member being engaged with a reel seat section of the fishing rod; and wherein the fishing rod is positioned between the hook of the clasp member and the second surface of the handle body.

2. The fishing rod handle device of claim 1, the latch member comprising:

wherein the control linkage being a threaded shaft;

a latch;

a screw socket;

a nut;

the latch being mounted opposite to the screw socket across the nut;

a first terminal end of the screw socket being positioned within the channel adjacent the first surface; and the screw socket being detachably engaged to the terminal end of the threaded shaft.

3. The fishing rod handle device of claim 2, comprising:

the screw socket comprising a socket body and a flange;

the flange being terminally mounted onto the socket body opposite to the first terminal end; and a transverse cross section of the flange being greater than a transverse cross section of the channel.

4. The fishing rod handle device of claim 1, wherein the grip portion is angularly offset from the channel.

5. The fishing rod handle device of claim 1, comprising:

a cradle attachment;

the cradle attachment comprising an armrest, a connecting base, and a fastener;

the armrest being mounted onto a planar surface of the connecting base;

the fastener being detachably mounted onto a curved surface of the connecting base, opposite to the planar surface;

the cradle attachment being detachably mounted onto a fishing rod; and the fastener being removably engaged with a handle portion of the fishing rod.

6. The fishing rod handle device of claim 5, comprising:

the fastener comprising a fastening belt and a fastening key;

the fastening belt being mounted onto the curved surface of the connecting base creating a loop;

the fastening key being operably coupled to the fastening belt, such that manipulating the fastening key governs the diameter of the loop.

7. The fishing rod handle device of claim 5, wherein the armrest being semi-circular in shape.

8. The fishing rod handle device of claim 1, comprising:

a shoulder strap; and the shoulder strap being detachably connected to the latch member.

9. A fishing rod handle device, comprising:

a handle body;

a clasp member;

a latch member;

a channel;

a cradle attachment;

the handle body comprising a grip portion;

the clasp member comprising a control linkage and a hook;

the cradle attachment comprising an armrest, a connecting base, and a fastener;

the channel normally traversing into the handle body;

the grip portion being laterally mounted onto the handle body;

the hook being terminally mounted onto the control linkage;

the control linkage being engaged within the channel;

a terminal end of the control linkage protruding out of the channel adjacent a first surface of the handle body;

the hook protruding out of the channel adjacent a second surface of the handle body opposite to the first surface;

the latch member being operably connected to the clasp member, such that rotary motion of the latch member governs the distance between a bottom edge of the hook and the second surface of the handle body;

the armrest being mounted onto a planar surface of the connecting base;

the fastener being detachably mounted onto a curved surface of the connecting base, opposite to the planar surface;

the handle body being detachably mounted onto a fishing rod;

the clasp member being engaged with a reel seat section of the fishing rod;

wherein the fishing rod is positioned between the hook of the clasp member and the second surface of the handle body.

10. The fishing rod handle device of claim 9, the latch member comprising:

wherein the control linkage being a threaded shaft;

a latch;

a screw socket;

a nut;

the screw socket comprising a socket body and a flange;

the latch being mounted opposite to the screw socket across the nut;

a first terminal end of the screw socket being positioned within the channel adjacent the first surface;

the screw socket being detachably engaged to the terminal end of the threaded shaft;

the flange being terminally mounted onto the socket body opposite to the first terminal end; and a transverse cross section of the flange being greater than a transverse cross section of the channel.

11. The fishing rod handle device of claim 10, comprising:

a shoulder strap; and the shoulder strap being detachably connected to the latch.

12. The fishing rod handle device of claim 9, comprising:

the fastener comprising a fastening belt and a fastening key;

the fastening belt being mounted onto the curved surface of the connecting base creating a loop;

the fastening key being operably coupled to the fastening belt, such that manipulating the fastening key governs the diameter of the loop.

13. The fishing rod handle device of claim 9, wherein the grip portion is angularly offset from the channel.

14. The fishing rod handle device of claim 9, wherein the armrest being semi-circular in shape.

15. The fishing rod handle device of claim 9, comprising:
the cradle attachment being detachably mounted onto a fishing rod; and
the fastener being removably engaged with a handle portion of the fishing rod.

* * * * *